(12) United States Patent
Yoo

(10) Patent No.: US 7,278,146 B2
(45) Date of Patent: Oct. 2, 2007

(54) APPARATUS AND METHOD FOR LOCKING TRAY OF DISC DRIVE

(75) Inventor: Young-taek Yoo, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 835 days.

(21) Appl. No.: 10/633,315

(22) Filed: Aug. 4, 2003

(65) Prior Publication Data
US 2004/0061418 A1   Apr. 1, 2004

(30) Foreign Application Priority Data
Aug. 26, 2002  (KR)  ............ 10-2002-0050526

(51) Int. Cl.
*G11B 17/03*  (2006.01)
(52) U.S. Cl. .................... 720/610; 369/30.27
(58) Field of Classification Search ............ 369/30.01, 369/30.27; 720/602, 606, 609, 610
See application file for complete search history.

(56) References Cited

U.S. PATENT DOCUMENTS 6,549,490 B1 * 4/2003 Howarth .............. 369/30.27
2002/0172125 A1 * 11/2002 Liao et al. ............ 369/75.2

FOREIGN PATENT DOCUMENTS

JP      2001-210003      8/2001

* cited by examiner

*Primary Examiner*—Wayne Young
*Assistant Examiner*—Abdukader Muhammed
(74) *Attorney, Agent, or Firm*—Staas & Halsey LLP

(57) ABSTRACT

An apparatus and method for locking a tray to prevent a tray from being broken by an abnormal operation are provided. The tray-locking apparatus for a disc drive comprising a motor, a power supply unit, and a control unit. The motor is driven to move the tray into or out of the disc drive. The power supply unit supplies power supply to the motor. The control unit controls the power supply unit to cut off the power supply supplied to the motor, if a tray-locking command is input. The tray can be prevented from being opened and broken by carelessness of a user. Further, a current consumption of the disc drive is reducable by cutting off the power supply supplied to the loading motor.

12 Claims, 4 Drawing Sheets

APPARATUS AND METHOD FOR LOCKING TRAY OF DISC DRIVE

CROSS-REFERENCE TO RELATED APPLICATION

This application claims the benefit of Korean Patent Application No. 2002-50526, filed Aug. 26, 2002, in the Korean Intellectual Property Office, the disclosure of which is incorporated herein by reference.

BACKGROUND OF THE INVENTION

1. Field of the Invention

The present invention relates to an apparatus and method for locking a tray in a disc drive, and more particularly, to an apparatus and method for locking a tray to prevent the tray from being broken by an abnormal operation.

2. Description of the Related Art

Disc drives, such as a compact disc (CD) player, a digital versatile disc (DVD) player, and a CD/DVD-ROM (read only memory) drive, drive optical discs. A tray for a disc drive is a mechanism on which the optical disc is loaded. The tray is constructed to be movable into and out of the disc drive in a straight line due to a rotation of a loading motor included in the disc drive.

If a tray opening command is input, the tray is moved out of the disc drive, and if a tray closure command is input, the tray is moved into the disc drive. The tray opening and closure commands may be input using a button on a front panel of the disc drive or a button on a remote controller to remotely control the disc drive, or by directly pressing a front panel of the tray.

In a case where the tray is moved into or out of the disc drive by directly pressing the front panel of the tray, the tray may be broken by carelessness of a user. That is, in a case where the user, who lacks knowledge about the tray, presses the front panel of the tray carelessly, the tray is opened such that the possibility exists that the tray may break. Further, in a case where a user, who lacks experience at handling the disc drive, opens the tray by needlessly pressing an opening button of the tray, the possibility exists for the tray to break. For example, in a case where the tray is opened by a child and the child presses down on the tray or places a foreign object on the tray, the possibility exists for the tray to break.

SUMMARY OF THE INVENTION

The present invention provides an apparatus and method for locking a tray to prevent a tray from being broken by an abnormal operation.

According to an aspect a tray-locking apparatus for a disc drive is provided comprising a motor to move the tray into or out of the disc drive; a power supply unit to supply a power supply to the motor; and a control unit to control the power supply unit to cut off the power supply supplied to the motor, if a tray-locking command is input.

Additional objects and/or advantages of the invention will be set forth in part in the description which follows and, in part, will be obvious from the description, or may be learned by practice of the invention.

The tray-locking apparatus may further comprise a memory which is controlled by the control unit if requested that the power supply of the disc drive be turned off and which stores information to represent a tray-locking state.

If a turn-on related signal of the power supply is input in a state where the power supply of the disc drive is turned off, the control unit may determine whether a tray-locking mode is set depending on whether the information to represent the tray-locking state is stored in the memory.

When the power supply of the disc drive is controlled by the turn-on related signal of the power supply, if the information to represent the tray-locking state is stored in the memory, the control unit may control the power supply unit to maintain a state where the power supply is not supplied to the motor.

The tray-locking apparatus may further comprise a display unit which is controlled by the control unit to display the information to represent the tray-locking state.

When the tray-locking command is input, if the tray is opened, the control unit may control the motor to move the tray into the disc drive to cut off the power supply supplied to the motor.

According to another aspect, a method for locking a tray for a disc drive is provided, comprising receiving a tray-locking request; and cutting off a power supply supplied to a motor to move the tray into or out of the disc drive, if the tray-locking request is received.

The method may further comprise checking whether the tray is opened if the tray-locking request is received; if the tray is opened, driving the motor to close the tray, and then cutting off the power supply; and if the tray is closed, cutting off the power supply.

The method may further comprise storing information to represent the tray-locking state, if requested that the power supply of the disc drive be turned off; and turning off the power supply of the disc drive.

The method may further comprise supplying the power supply to components of the disc drive except for the motor, if a turn-on related signal of the power supply of the disc drive is input in a state where the power supply of the disc drive is turned off; checking whether the tray-locking mode is set; and maintaining a state where the power supply is not supplied to the motor if the tray-locking mode is set.

The method may further comprise displaying information to represent the tray-locking state if the tray-locking mode is set.

The method may further comprise supplying the power supply to the motor if the tray-locking mode is not set.

BRIEF DESCRIPTION OF THE DRAWINGS

These and/or other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

Figure 1:
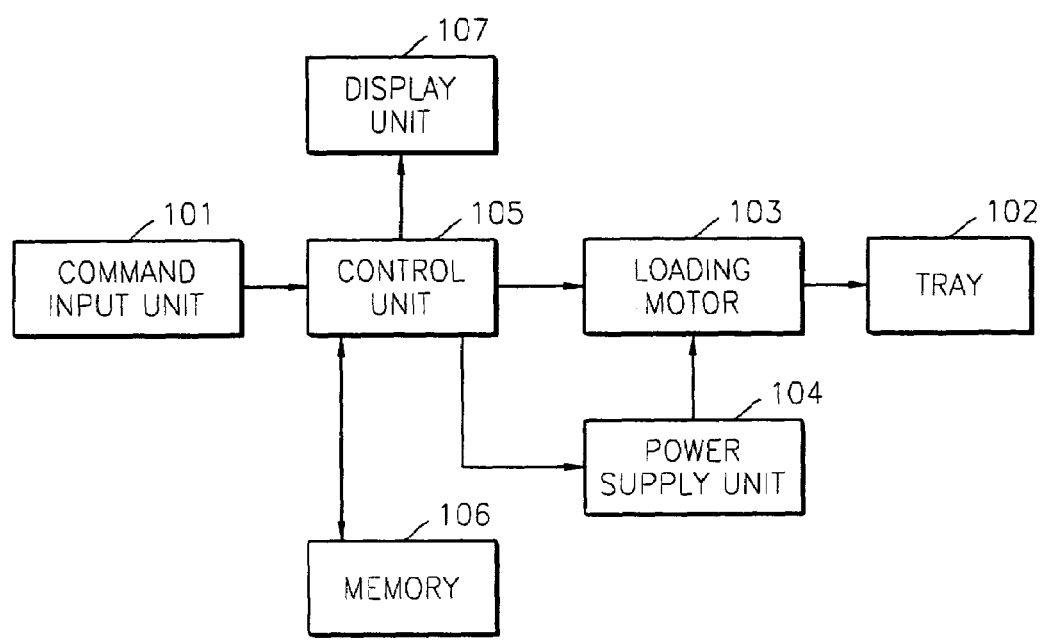
FIG. 1 is block diagram of a tray-locking apparatus for a disc drive according to an embodiment of the present invention.

Reference will now be made in detail to the present preferred embodiment of the present invention, examples of which are illustrated in the accompanying drawings, wherein like reference numerals refer to the like elements throughout. The embodiment is described below in order to explain the present invention by referring to the figures.

Referring to FIG. 1, a tray-locking apparatus includes a command input unit 101, a tray 102, a loading motor 103, a power supply unit 104, a control unit 105, a memory 106, and a display unit 107.

The command input unit 101 inputs a command of a user to control an operation of a disc drive. Thus, a tray-locking request, a request to turn on/off a power supply, a reproduction request of the disc drive and a tray opening/closure command (or a front panel opening/closure command) are inputtable via the command input unit 101. The command input unit 101 may include a key or a button for an exclusive use of inputting the tray-locking request, the ON/OFF request to turn on/off the power supply, the reproduction request of the disc drive, and the tray opening/closure command, respectively.

After loading a disc (not shown) in the disc drive, if the tray closure command is applied through the command input unit 101 or a front panel of the tray is pressed, the tray 102 is constructed to move into the disc drive. If the tray opening command is applied through the command input unit 101 or the front panel of the tray is pressed in a state where the tray is closed, the tray 102 is constructed to move out of the disc drive.

The loading motor 103 is controlled by the control unit 105 described below to move the tray 102 into or out of the disc drive. That is, the tray 102 is moved into or out of the disc drive by driving the loading motor 103. A known method may be used as a method for driving the loading motor 103.

The power supply unit 104 is controlled by the control unit 105 to supply the power supply to components of the disc drive, for which the power supply is necessary, including the loading motor 103.

If a tray-locking request signal is received through the command input unit 101 in a state where the power supply of the disc drive is turned on, the control unit 105 controls the power supply unit 104 to cut off the power supply supplied to the loading motor 103. In this case, the tray 102 is assumed to be closed. If the tray-locking request signal is received in a state where the tray 102 is opened, the control unit 105 controls the loading motor 103 to move the tray 102 into the disc drive, and thereafter, controls the power supply unit 104 to cut off the power supply supplied to the loading motor 103.

If the turn-off request of the power supply of the disc drive is sent from the command input unit 101 in a state where a locking mode with respect to the tray 102 is set, the control unit 105 stores information to represent the tray-locking state in the memory 106, and then controls the power supply unit 104 to turn off the power supply of the disc drive.

If the power supply of the disc drive is turned off through the above-described processes, and thereafter, a turn-on related signal of the power supply of the disc drive is input through the command input unit 101, the control unit 105 controls the power supply unit 104 to turn on the power supply of the disc drive. At this time, the control unit 105 controls the power supply unit 104 to prevent the power supply from being supplied to the loading motor 103.

Next, the control unit 105 checks whether the information to represent the tray-locking state is stored in the memory 106. If the information to represent the tray-locking state is stored in the memory 106, the control unit 105 controls the power supply unit 104 to maintain a state where the power supply is not supplied to the loading motor 103. Further, the control unit 105 controls the display unit 107 to display the information to represent the tray-locking state.

However, if the locking mode with respect to the tray 102 is determined not to be set based on the information stored in the memory 106, the control unit 105 controls the power supply unit 104 to supply the power supply to the loading motor 103.

The turn-on related signal of the power supply may include a turn-on signal of the power supply, a tray opening request signal, and the reproduction request signal of the disc drive. In a case where the tray opening request signal of the disc drive is input and the locking mode with respect to the tray 102 is not set, the control unit 105 controls the power supply unit 104 to supply the power supply to the loading motor 103, and thereafter, controls the loading motor 103 so that the tray 102 is opened. If the reproduction request signal is input and the locking mode with respect to the tray 102 is not set, the control unit 105 controls the power supply unit 104 to supply the power supply to the loading motor 103, and thereafter, controls a reproduction mode with respect to the disc loaded in the tray 102.

The memory 106 is a nonvolatile memory. Thus, the memory 106 stores information although the power supply of the disc drive is turned off.

The display unit 107 is constructed to display information representing the locking state with respect to the tray 102. The information to represent the tray-locking state may be expressed as a letter or a figure, etc.

Figure 2:
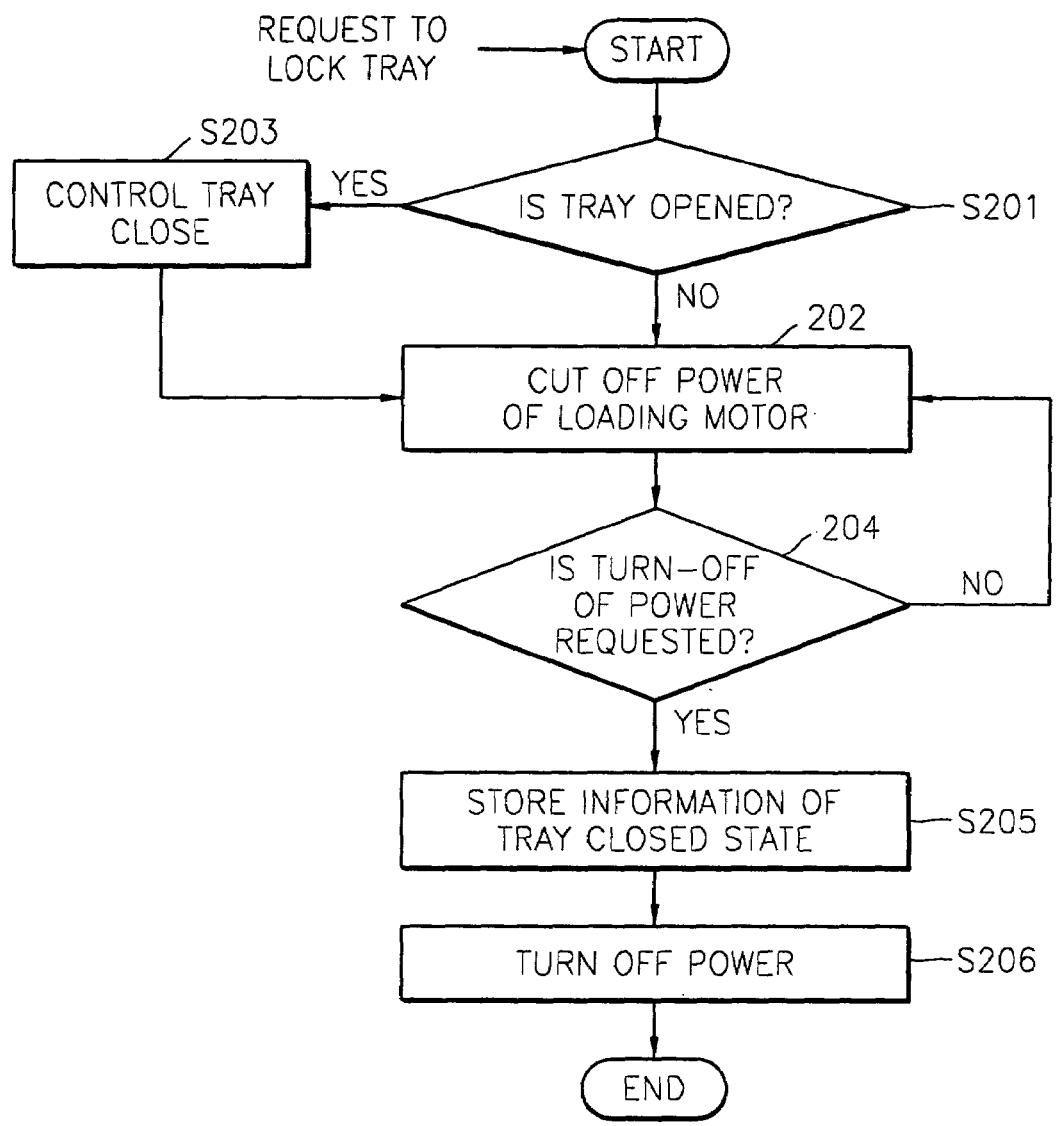
FIG. 2 is an operation flow chart of a method of locking a tray according to the embodiment of the present invention.

FIG. 2 is an operation flow chart of a method of locking the tray according to the embodiment of the present invention;

If the locking request signal with respect to the tray 102 is received, whether the tray 102 is opened is checked in operation S201. If the tray 102 is closed, the power supply supplied to the loading motor 103 is cut off in operation S202. However, if the tray 102 is opened, the loading motor 103 is controlled to automatically close the tray 102 in operation S203, and thereafter, operation S202 is processed.

If the signal to request the power supply to be turned off is determined to be received in operation S204, the control unit 105 stores the information to represent the tray-locking state in the memory 106 in operation S205. Thereafter, the power supply of the disc drive is turned off in operation S206. However, if the signal to request the power supply to be turned off is determined not to be received in operation S204, the operation mode of operation S202 is maintained. The cutoff of the power supply supplied to the loading motor 103 may be stopped by a request to unlock the tray 102.

Figure 3:
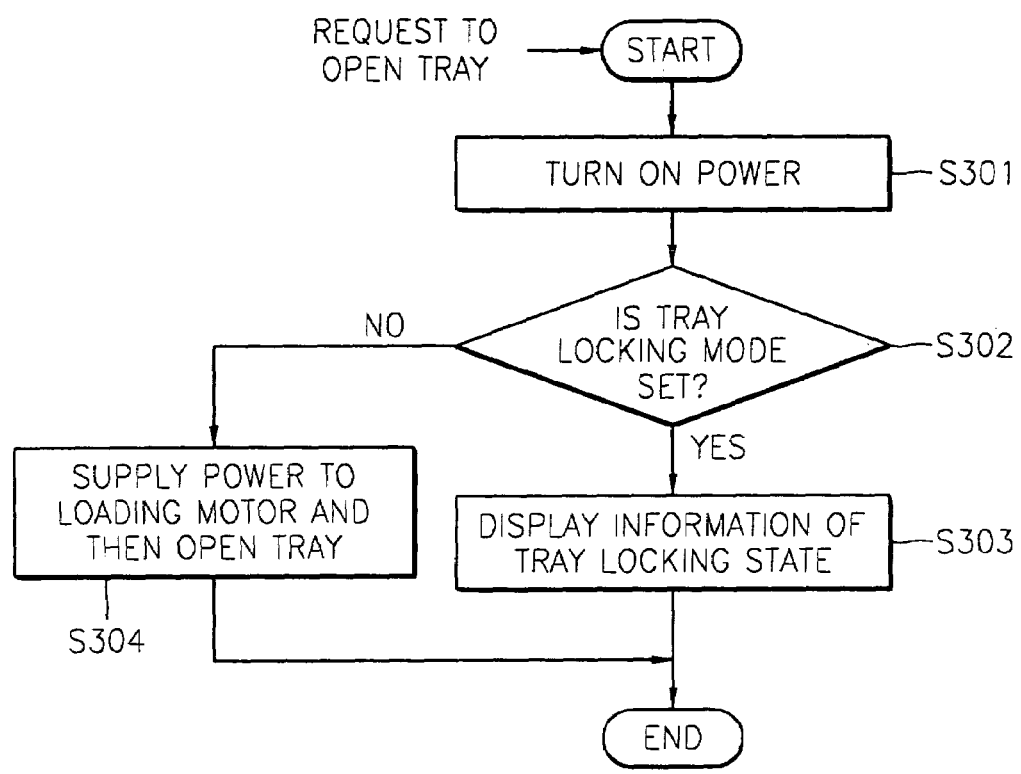
FIG. 3 is a flow chart showing an operation of requesting that the tray be opened, in the method of locking the tray according to the embodiment of the present invention.

FIG. 3 is a flow chart showing an operation of requesting the tray to be opened after turning off the power supply of the disc drive, in a method of locking the tray according to the embodiment of the present invention.

If the tray is requested be opened, the power supply of the disc drive is turned on in operation S301. At this time, the power supply is not supplied to the loading motor 103. Whether the locking mode with respect to the tray 102 is set is checked in operation S302. Further, whether the locking mode with respect to the tray 102 is set based on the information stored in the memory 106 is determined. That is, if the information to represent the tray-locking state is stored in the memory 106, the locking mode with respect to the tray 102 is determined to be set. If the information to represent the tray-locking state is not stored in the memory 106, the locking mode with respect to the tray 102 is determined not to be set.

If the locking mode with respect to the tray 102 is determined to be set in operation S302, the information to represent the locking mode with respect to the tray 102 is displayed in operation S303. At this time, a state where the power supply is not supplied to the loading motor 103 is maintained.

However, when the locking mode with respect to the tray 102 is determined not to be set in operation S302, the control unit 105 controls the power supply unit 104 to supply the power supply to the loading motor 103 and controls the loading motor 103 so that the tray 102 is opened in operation S304.

Figure 4:
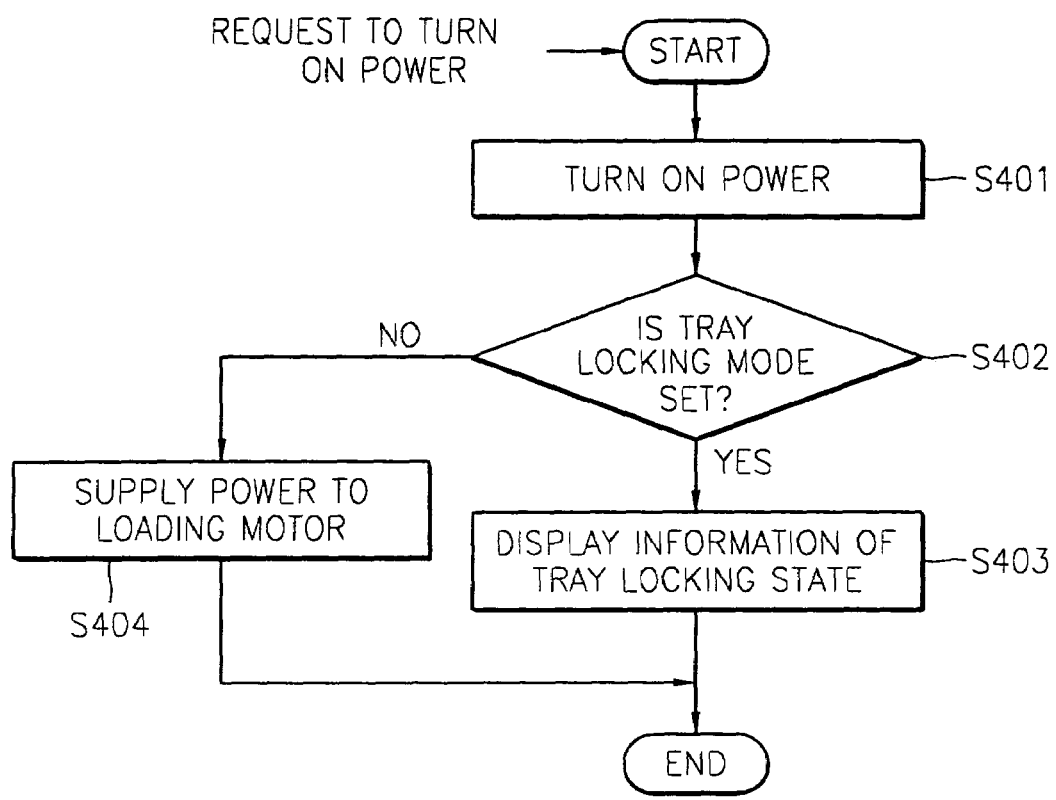
FIG. 4 is a flow chart showing an operation of requesting a power supply to be turned on, in a method of locking the tray according to the embodiment of the present invention.

FIG. 4 is a flow chart showing an operation of requesting that the power supply is turned on in a state where the power supply of the disc drive is turned off, in a method of locking the tray according to the embodiment of the present invention.

If the turn-on request signal of the power supply is input, the power supply of the disc drive is turned on in operation S401. At this time, the power supply is not supplied to the loading motor 103. Whether the locking mode with respect to the tray 102 is set is determined in operation S402. Whether the locking mode with respect to the tray 102 is set is determined by the method used in operation S302 of FIG. 3.

If the locking mode with respect to the tray 102 is determined to be set in operation S402, the information to represent the locking mode with respect to the tray 102 is displayed on the display unit 107 in operation S403. At this time, a state where the power supply is not supplied to the loading motor 103 is maintained.

However, if the locking mode with respect to the tray 102 is determined not to be set in operation S402, the control unit 105 controls the power supply unit 104 to supply the power supply to the loading motor 103 in operation S404.

Further, even if the power supply is turned on by a signal requesting the disc drive to be reproduced, the present invention can be applied. That is, if the signal requesting the disc drive to be reproduced is input, the power supply is supplied to the components included in the disc drive except for the loading motor 103. Thereafter, whether the locking mode with respect to the tray 102 is set is determined. If the locking mode with respect to the tray 102 is determined to be set, the information to represent the locking mode with respect to the tray 102 is displayed and simultaneously a normal reproduction mode on the disc loaded in the disc drive is performed. At this time, the power supply is not supplied to the loading motor 103. However, if the locking mode with respect to the tray 102 is determined not to be set, the normal reproduction mode with respect to the disc loaded on the tray 102 is preformed while supplying the power supply to the loading motor 103.

As described above, the tray-locking mode is set by cutting off the power supply supplied to the loading motor and is maintained in a state where the power supply of the disc drive is turned off, and as a result, the tray can be prevented from being opened and broken by carelessness of the user.

Further, when the tray-locking mode is set, a current consumption of the disc drive is reduceable by cutting off the power supply supplied to the loading motor.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. An apparatus for locking a tray of a disc drive, comprising:
    a motor driven to move the tray into or out of the disc drive;
    a power supply unit to supply a power supply to the motor; and
    a control unit to control the power supply unit to cut off the power supply supplied to the motor, if a tray-locking command is input,
    wherein when the tray-locking command is input, if the tray is opened, the control unit controls the motor to move the tray into the disc drive and to cut off the power supply supplied to motor.

2. The apparatus of claim 1, further comprising:
    a memory which is controlled by the control unit if the power supply of the disc drive is requested to be turned off and which stores information to represent a tray-locking state.

3. The apparatus of claim 2, wherein if a turn-on related signal of the power supply is input in a state when the power supply of the disc drive is turned off, the control unit determines whether a tray-locking mode is set depending on whether the information representing the tray-locking state is stored in the memory.

4. The apparatus of claim 3, wherein when the power supply of the disc drive is controlled by the turn-on related signal of the power supply, if the information to represent the tray-locking state is stored in the memory, the control unit controls the power supply unit to maintain a state where the power supply is not supplied to the motor.

5. The apparatus of claim 3, further comprising:
    a display unit which is controlled by the control unit to display the information representing the tray-locking state.

6. The apparatus of claim 1, further comprising a display unit which is controlled by the control unit to display information representing the tray-locking state.

7. A method of locking a tray for a disc drive, comprising:
    receiving a tray-locking request;
    cutting off a power supply supplied to a motor driven to move the tray into or out of the disc drive, if the tray-locking request is received;
    checking whether the tray is open if the tray-locking request is received;
    driving the motor to close the tray if the tray is open, and cutting off the power supply; and
    cutting off the power supply if the tray is closed.

8. The method of claim 7, further comprising:
    storing information representing a tray-locking state, if the power supply of the disc drive is requested to be turned off; and
    turning off the power supply of the disc drive.

9. The method of claim 8, further comprising:
    supplying the power supply to components of the disc drive except for the motor, if a turn-on related signal of the power supply of the disc drive is input in a state where the power supply of the disc drive is turned off;
    checking whether a tray-locking mode is set; and
    maintaining a state where the power supply is not supplied to the motor if the tray-locking mode is set.

10. The method of claim 9, further comprising:
    displaying information representing the tray-locking state if the tray-locking mode is set.

11. The method of claim 7, further comprising:
    displaying information representing a tray-locking state if a tray-locking mode is set.

12. The method of claim 9, further comprising:
    supplying the power supply to the motor if the tray-locking mode is not set.

* * * * *

UNITED STATES PATENT AND TRADEMARK OFFICE
CERTIFICATE OF CORRECTION

PATENT NO. : 7,278,146 B2 Page 1 of 1
APPLICATION NO. : 10/633315
DATED : October 2, 2007
INVENTOR(S) : Young-taek Yoo It is certified that error appears in the above-identified patent and that said Letters Patent is hereby corrected as shown below:

Title Page, Column 2 Item [57] (Abstract), Line 11, change "reducable" to --reducible--.

Signed and Sealed this

Twenty Second Day of April, 2008

JON W. DUDAS
*Director of the United States Patent and Trademark Office*